United States Patent
Li et al.

(10) Patent No.: US 9,386,308 B2
(45) Date of Patent: Jul. 5, 2016

(54) QUALITY OPTIMIZATION WITH BUFFER AND HORIZON CONSTRAINTS IN ADAPTIVE STREAMING

(71) Applicant: Cisco Technology, Inc., San Jose, CA (US)

(72) Inventors: Zhi Li, Mountain View, CA (US); Ali C. Begen, London (CA); Joshua B. Gahm, Newtonville, MA (US); Bruce P. Osler, Boxborough, MA (US); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 386 days.

(21) Appl. No.: 13/943,445

(22) Filed: Jul. 16, 2013

(65) Prior Publication Data
US 2015/0023404 A1    Jan. 22, 2015

(51) Int. Cl.
H04N 7/12       (2006.01)
H04N 19/189     (2014.01)
H04N 19/152     (2014.01)
H04L 29/06      (2006.01)

(52) U.S. Cl.
CPC ...... H04N 19/00345 (2013.01); H04L 65/4084 (2013.01); H04L 65/80 (2013.01); H04N 19/00193 (2013.01); H04N 19/152 (2014.11); H04N 19/189 (2014.11)

(58) Field of Classification Search
CPC .................. H04N 19/00345; H04N 19/00193; H04N 19/152; H04N 19/189; H04L 65/4084; H04L 65/80
USPC ................................... 375/240.02
See application file for complete search history.

(56) References Cited

U.S. PATENT DOCUMENTS

| | | | |
|---|---|---|---|
| 2010/0235472 A1 | 9/2010 | Sood et al. | |
| 2013/0042015 A1 | 2/2013 | Begen et al. | |
| 2013/0286868 A1* | 10/2013 | Oyman | H04W 24/06 370/252 |

FOREIGN PATENT DOCUMENTS

| | | |
|---|---|---|
| EP | 2410743 A1 | 1/2012 |
| EP | 2525587 A1 | 11/2012 |

OTHER PUBLICATIONS

International Search Report and Written Opinion in counterpart International Application No. PCT/US2014/046633, mailed Oct. 17, 2014, 11 pages.
Crabtree, et al., "Field trial of Quality Driven Video Streaming," 4th IEEE International Workshop on Future Multimedia Networking, Jan. 14-17, 2012, pp. 554-558.

\* cited by examiner

*Primary Examiner* — Allen Wong
(74) *Attorney, Agent, or Firm* — Edell, Sharpiro & Finnan, LLC (57) ABSTRACT

Techniques are provided for optimizing quality in adaptive streaming, where information is obtained relating to encoding bitrates and content quality scores for content segments of a content stream. The content segments of the content stream are provided by a content server and downloaded by a computing device. For each content segment, an encoding bitrate is determined for downloading the content segment from the content server, where determining the encoding bitrate for a current content segment is based upon an estimated current network bandwidth, constraints of a buffer into which downloaded content segments are stored, and also upon quality scores associated with content segments within a selected horizon extending from the current content segment to a future content segment in the content stream at an endpoint of the horizon. Each content segment with the determined bitrate for the content segment is downloaded from the content server.

20 Claims, 6 Drawing Sheets

QUALITY OPTIMIZATION WITH BUFFER AND HORIZON CONSTRAINTS IN ADAPTIVE STREAMING

TECHNICAL FIELD

The present disclosure relates to adaptive streaming in computer networks.

BACKGROUND

In conventional adaptive streaming, a video stream is divided into short segments of a few seconds each, with segments being encoded (or transcoded) from a master high-quality source at several different bitrates and the output stored at a server from which clients fetch the segments. A common practice is for the encoder/transcoder to employ constant-bitrate (CBR), resulting in a set of tiers, or "levels" of video output. A client application downloads the segments from the server (often sequentially) using HTTP GET requests, estimates the available bandwidth using measurements of the download performance, and selects the video level of the next segment to fetch at the completion of the prior segment.

Typically, tens of seconds of downloaded video segments are buffered at the client to accommodate bandwidth fluctuations. A viable rate adaptation algorithm achieves high average video quality, low variation of video quality, and low probability of video playout stalls caused by buffer underruns.

DESCRIPTION OF EXAMPLE EMBODIMENTS

Overview

Techniques are described herein for optimizing quality in adaptive streaming, where information is obtained relating to encoding bitrates and video quality scores for video segments of a content stream. The video segments of the content stream are provided by a content server and downloaded by a computing device. For each video segment, an encoding bitrate is determined for downloading the video segment from the content server, where determining the encoding bitrate for a current video segment is based upon an estimated current available network bandwidth, constraints of a buffer in which downloaded video segments are stored and also upon quality scores associated with video segments within a selected horizon extending from the current video segment to a future video segment in the content stream at an endpoint of the horizon. Each content segment with the determined bitrate for the content segment is downloaded from the content server.

Example Embodiments

Techniques are described herein for improving the quality of content in adaptive streaming by applying a dynamic rate adaption analysis that optimizes a quality level for each video segment fetched or downloaded from a content server based upon a given time horizon of video segments. The analysis takes into account storage buffer and horizon constraints associated with a computing device displaying the content, where video quality optimization is determined based upon a constraint that the client buffer is confined between a maximum level (e.g., for low-latency live streaming) and a minimum level (e.g., for on-demand streaming to minimize the potential for buffer underrun). An encoding bitrate associated with an optimized quality level is selected for each video segment, where the optimized quality level is based only on video segments within a selected horizon in the near future of a temporal stream of video segments for the content.

The techniques described herein can be used regardless of whether the video content from the content server is constant bitrate (CBR) or variable bitrate (VBR) encoded. The techniques described herein further avoid any statistical modeling of link bandwidth variation but instead are configured to optimize video quality for any potential scenario (since the video quality for each segment is determined based upon current buffer constraints and a finite or selected future horizon of video segments). Some non-limiting examples of video quality scores that can be implemented for the techniques of optimizing quality for video segments as described herein include PSNR (Peak Signal-To-Noise Ratio) and the negation of MSE (Mean-Squared Error, or -MSE), MS-SSIM (Multi-Scale Structural Similarity) and VQM (Video Quality Metric).

The embodiments of adaptive streaming systems and methods described herein use constant quality, or near constant quality, segments (also referred to as chunks or fragments) to provide a better viewing experience, even during upshifts and downshifts in adaptive streaming. In described embodiments, a computing device may directly track and optimize quality by choosing constant quality segments such that the computing device maintains a smooth quality over time while letting the bandwidth fluctuate, thus freeing bandwidth for other clients that might otherwise be wasted pulling more data than is needed for the current quality level. The computing device accomplishes this by: (a) receiving the highest quality representation within an available bandwidth, (b) upshifting to a higher quality representation when bandwidth is available (rather than upshifting to a higher bitrate even though quality may not be improved), and/or (c) downshifting to a lower quality when bandwidth is scarce.

Adaptive streaming systems generally fall into either push-based or pull-based systems. Though certain embodiments of adaptive streaming systems may be employed for the benefit of push-based systems (or a combination of push and pull-based systems), the focus of the present disclosure is on pull-based systems. In pull-based adaptive streaming, clients decide which segment to request next from a source (e.g., origin or content server, cache server, etc.). Such a decision may be based on various properties of the content segment and observations, such as current (observed or available) bandwidth and the amount of data in the client buffer. In current systems, the adaptation may take the form of requesting segments encoded at different bitrates. For example, a client may upshift or downshift (e.g., switch to a different bitrate) or stay at the same bitrate to provide continuous playout. The bitrate switching decision is revised based on a predetermined schedule and then a new segment at the determined bitrate is requested. Various objective functions are possible, and clients may differ in the algorithms used to attempt to maximize the delivered video quality within the available bandwidth constraints. A common trait among traditional systems, however, is the use of the segment encoding bitrate as a surrogate variable for video quality.

In embodiments described herein, rather than using an encoder to encode content at various target bitrates, an encoder of the disclosed adaptive streaming systems encodes the content at various quality levels, and then segments (or similarly, fragments) the encoded streams into segments based on temporal duration whose size in bytes depends on the encoding rate, which in turn corresponds to the required transmission bandwidth on a network. Quality variations according to a predetermined quality window enable constraints on the bitrate variations.

For example, an encoder (or in some embodiments, another network device such as a server) provides a content matrix organized directly (e.g., explicitly indicated) by quality level. In other words, each representation corresponds to a (single) quality level rather than a nominal or average bitrate. Metadata for each segment comprises a quality level, and temporal duration and either size of the segment in bytes or segment average bitrate (these last two are conjugate variables—one can be computed from the other knowing the temporal duration). In addition, a computing device according to certain embodiments of adaptive streaming systems is configured to achieve smooth, non-decreasing quality within given bandwidth constraints by choosing the next segment based upon techniques as described herein.

In some embodiments, such a quality-based adaptive streaming scheme may be embedded into the metadata to enable existing computing devices (without modification to software and/or hardware) to send a request (e.g., based on timestamp, bitrate, etc. as conventionally done) and a network device (e.g., a source or cache server) accesses a segment having the highest quality level based upon the techniques as described herein.

These and other embodiments and/or other features are described hereinafter in the context of an example computer network environment, with content embodied as video for the sake of facilitating an understanding of the disclosure. It should be appreciated that other content (e.g., audio, data, graphics, images, etc.), in lieu of or in addition to video, is also considered within the scope of the embodiments. Further, certain embodiments of adaptive streaming systems are described below in the context of adaptive streaming in an environment that uses the Hypertext Transfer Protocol (HTTP). HTTP is a request-response standard for client-server computing. In HTTP, Web browsers act as clients, while an application running on the computer hosting the Web site or content acts as a server. HTTP uses the Transmission Control Protocol (TCP) that is part of the Internet Protocol (IP) suite of communications protocols used for the Internet and other similar networks. One having ordinary skill in the art should understand that other networks distributing multimedia (e.g., video, graphics, audio, and/or data, or otherwise referred to also herein individually or collectively as media content or simply, content) may also benefit from certain embodiments of adaptive streaming systems and methods, and hence, are contemplated to be within the scope of the disclosure. It should be understood by one having ordinary skill in the art that, though specifics for one or more embodiments are disclosed herein, such specifics as described are not necessarily part of every embodiment.

Figure 1:
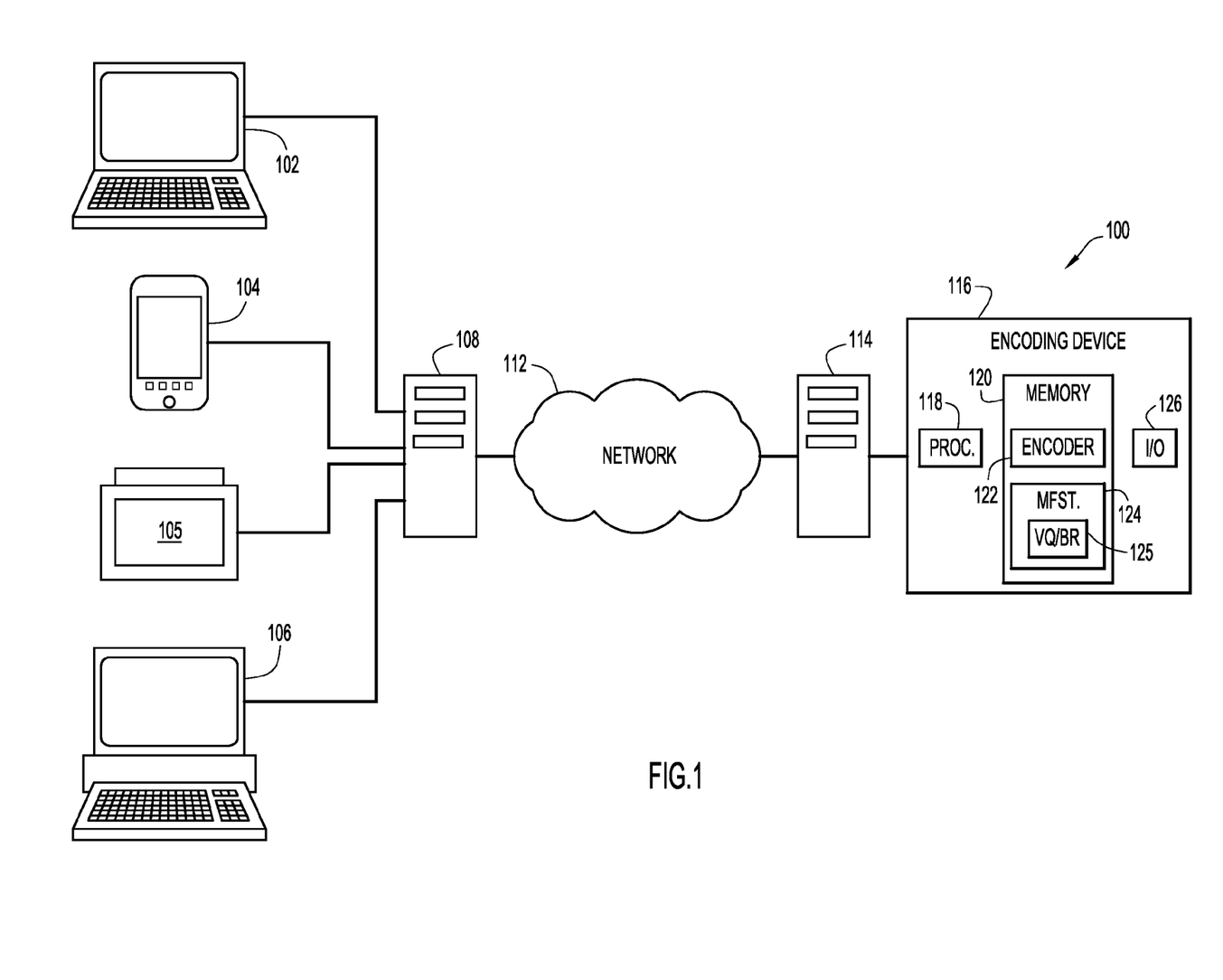
FIG. 1 is a schematic diagram of an example system in which adaptive streaming is utilized to provide video content over a network to computing devices.

FIG. 1 is a schematic diagram of an example environment, a computer network 100, in which certain embodiments of adaptive streaming systems and methods may be implemented. It should be understood by one having ordinary skill in the art, in the context of the present disclosure, that the computer network 100 shown in FIG. 1 is merely illustrative, and should not be construed as implying any limitations upon the scope of the disclosure. The computer network 100 may comprise a plurality of individual networks, such as a wireless network and/or a wired network. The example computer network 100 depicted in FIG. 1 includes a plurality of computing devices 102, 104, 105, and 106 (e.g., wired and/or wireless devices, such as cellular phones, personal digital assistants (PDAs), computer devices or systems such as laptops, personal computers, set-top terminals, televisions with communication capabilities, DVD/CD recorders, etc.) that are in communication with one or more server devices, such as an edge or cache server device 108, and/or one or more upstream devices, such as content server device 114. The content server device 114 is communicatively coupled to one or more encoding devices, such as encoding or transcoding device 116. Additional servers may be employed in the computer network 100. In some further example embodiments, the content server device 114 and encoding device 116 can be integrated as a single server device. The cache server device 108 is coupled to an upstream network, such as a wide area network (WAN) 112, which in one embodiment comprises the Internet. In some embodiments, the cache server device 108 may be coupled to the computing devices 102, 104, 105, and 106 via a network, such as a local area network (LAN). Other networks are contemplated to be within the scope of the disclosure, including networks that use packets incorporated with other transport protocols or standards. The cache server device 108 and content server device 114 may also comprise (e.g., be integrated with), or be in local communication with, one or more storage devices.

Communication between the cache server device 108 and the computing devices 102, 104, 105, and/or 106 may be via wireless or wired connections, including by way of non-limiting example Ethernet, token ring, private or proprietary networks, among others. The cache server device 108 and/or content server device 114 may comprise a server in an Internet Service Provider (ISP) facility, a private server, a gateway, and/or other devices or facilities used for communication of streaming video files (among other content, such as data, audio, etc.). One having ordinary skill in the art should understand that additional computing devices, cache server devices, upstream server devices, and other devices, such as routers, bridges, etc., may be employed in the computer network 100. Communication of Internet Protocol (IP) packets between the computing devices 102, 104, 105, and 106, the cache server device 108, and the content server device 114 may be implemented according to one or more of a plurality of different protocols, including Transmission Control Protocol (TCP)/IP, among others.

The encoding device 116 is configured with a processor 118, memory 120 configured with encoding logic (executable instructions or code) 122, and a communications (or network) interface (I/O) 126 to receive content streams for encoding and segmenting (also referred to as chunking or fragmenting) and send encoded streams in the form of segments of different quality levels to the content server 114. In one embodiment, the communications interface 126 receives a digitized content stream (e.g., a movie, a live broadcast of a television show or sports or entertainment event, etc.), and the processor 118 is configured by the encoding logic 122 to encode the content stream at a plurality of encoded representations of different quality levels. For instance, one representation may comprise an encoded version of the received content stream at a quality level (measured, e.g., in PSNR—Peak Signal-to-Noise Ratio) of 40 decibels (dB), a second representation may comprise an encoded version of the received content stream at a quality level of 35 dB, and a third representation may comprise an encoded version of the received content stream at a quality level of 30 dB. The processor 118 is further configured by the encoding logic 122 to segment each of the plural representations into segments of different quality levels. Metadata (e.g., location, such as an URL, or identification of each segment, segment size, quality level, bitrate, timestamp information, etc.) for all segments of a given quality level (e.g., 40 dB) are listed in a manifest (MFST) 124 under a respective representation. In other words, each representation corresponds to a different quality level. For instance, metadata for segments of quality level 40 dB are listed in the manifest under one representation, metadata for segments of quality level 35 dB are listed under a second representation, and so forth. In particular, the manifest includes information regarding a video quality score for each available segment bitrate (VQ/BR information 125). Each quality level is explicitly indicated (e.g., as opposed to being inferred from bitrate), with the explicit indication corresponding to a quality metric such as decibels, peak signal-to-noise ratio (PSNR), or other well-known quality metrics (e.g., –MSE, MS-SSIM or VQM). The encoding device 116 provides the manifest 124 (or in some embodiments, information used to assemble one elsewhere) and the segments for the various representations via the communications interface 126 to the content server device 114.

Although described in the context of encoding software or firmware logic 122 stored in memory 120, it should be understood to one having ordinary skill in the art that the encoding/segmenting functionality may be separated among a plurality of modules, or in some embodiments, implemented using hardware or a combination of hardware and software/firmware.

Figure 2:
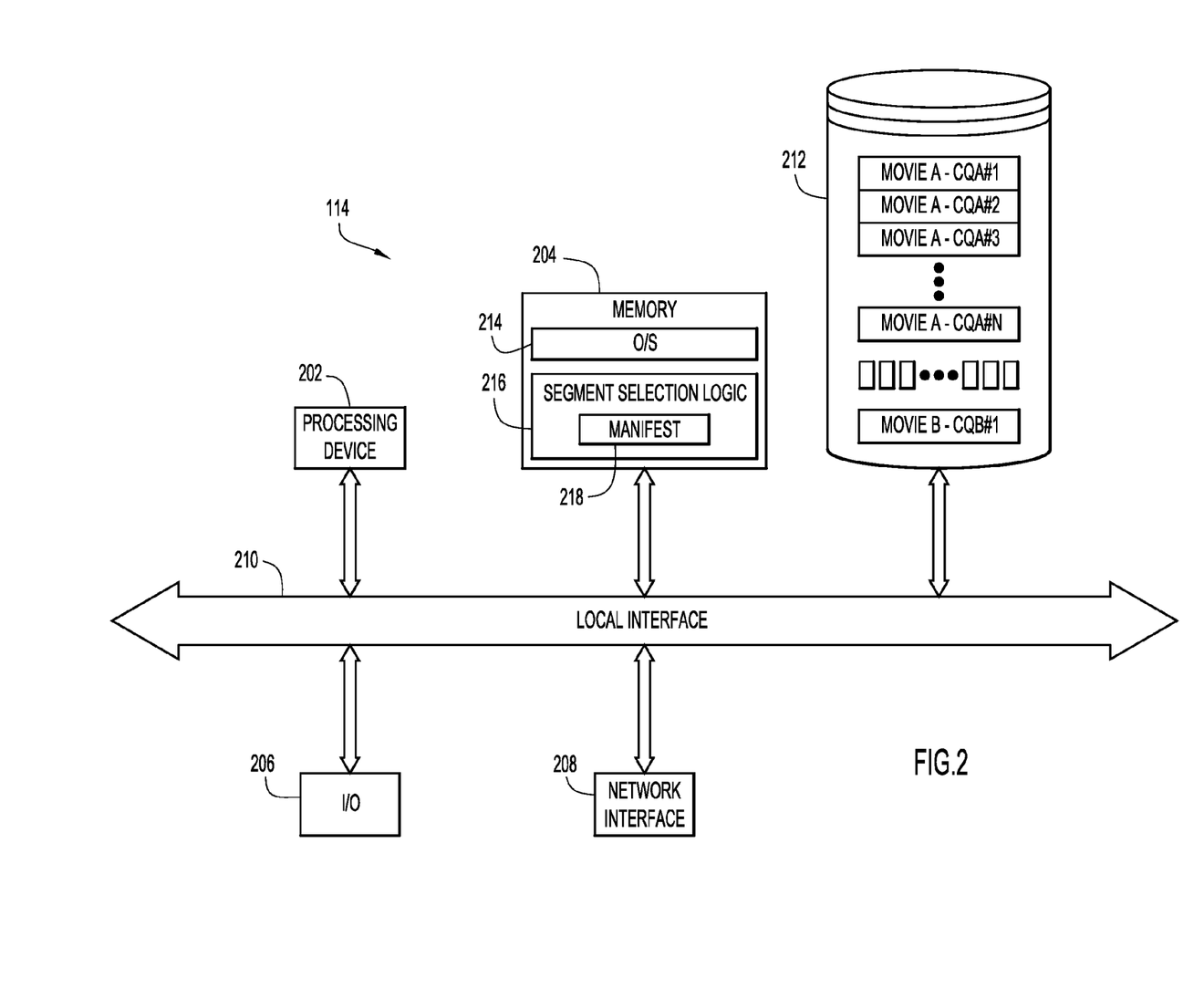
FIG. 2 is a schematic diagram of an example embodiment of a content server that provides segments of a content stream at different bitrates and quality levels to computing devices for the system of FIG. 1.

FIG. 2 is a block diagram of an embodiment of an example content server device 114. It should be understood by one having ordinary skill in the art, in the context of the present disclosure, that the content server device 114 shown in FIG. 2 is merely illustrative, and should not be construed as implying any limitations upon the scope of the disclosure. Generally, in terms of hardware architecture, the content server device 114 includes a processing device 202, memory 204, input/output (I/O) devices 206, and network interface 208, each of which is communicatively coupled via a local interface 210. The processing device 202 is a hardware device for executing software, particularly that which is stored in memory 204. The processing device 202 may be any custom made or commercially available processor, a central processing unit (CPU), an auxiliary processor among several processors associated with the content server device 114, a semiconductor-based microprocessor (in the form of a microchip or chip set), a microprocessor, or generally any device for executing software instructions.

The network interface 208 includes one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

The I/O devices 206 may include input devices, for example but not limited to, a keyboard, mouse, scanner, microphone, etc. Furthermore, the I/O devices 206 may also include output devices, for example but not limited to, a printer, display, etc.

The local interface 210 may be, for example but not limited to, one or more buses or other wired or wireless connections, as is known in the art. The local interface 210 may have additional elements, which are omitted for simplicity, such as controllers, buffers (caches), drivers, repeaters, and receivers, to enable communications. Further, the local interface 210 may include address, control, and/or data connections to enable appropriate communications among the aforementioned components.

In one embodiment, the content server device 114 is further configured with an integrated storage device 212 coupled to the local interface 210, the storage device 212 configured to store a plurality of content segments received from the encoding device 116. In some embodiments, the storage device 212 may be externally coupled to the content server device 114.

The memory 204 comprises a suitable operating system (O/S) 214 and segment selection logic 216. The operating system 214 essentially controls the execution of other computer programs, such as the segment selection logic 216, and provides scheduling, input-output control, file and data management, memory management, and communication control and related services. The segment selection logic 216 comprises executable code to respond to computing device requests for segments (e.g., HTTP functionality), as well as a data structure corresponding to a fully or partially (yet continually updated) completed manifest 218 that corresponds to the manifest 124 (or information therein) sent by the encoding device 116. In some implementations, the manifest 218 may not be complete, yet continually assembled and updated from the encoding device 116 (e.g., such as for live broadcasts).

The storage device 212 stores different representations of content in the form of segments of different quality levels. For instance, using a movie as an example, the storage device 212 stores a first representation of Movie A at a first quality level (e.g., constant quality (CQ) A#1), a second representation of Movie A at a second quality level (e.g., CQA#2), and so on. Each representation is in the form of plural segments at the given quality level, as partially illustrated by the individual, shorter blocks for representation CQA#N in FIG. 2 (and similarly applicable to the other representations). Each of the segments is typically independently decodable (e.g., each in the form of one or more Groups of Pictures (GoP)), and generally lasts in duration of 2-10 seconds, though not limited to these durations. For each of these different quality level segments, a corresponding representation with associated metadata for each of the segments is maintained in the manifest 218 stored in memory 204. The manifest 218, similar to manifest 124, also includes information regarding a video quality score for each available segment bitrate (VQ/BR information 125) for each movie or other video content.

The segment selection logic 216 is configured to respond to requests from the computing devices 102, 104, 105, and/or 106 (and/or to the cache server 108) for the manifest 218, or select portions thereof. These download or fetch requests may be serviced through either the same, or a different server connection as the one used to fetch or download content segments. Using the computing device 105 embodied as a set-top box as an example computing device hereinafter (with the understanding that similar principles apply to the other computing devices), in one embodiment, the computing device 105 requests a segment based on the listing of the manifest 218 fetched from the content server device 114. The computing device 105 is effectively requesting the segment by quality level, as opposed to bitrate, resulting in a smoother, constant quality viewing experience. In some embodiments, the manifest and referenced segments are served from the cache server device 108, facilitating rapid response to requests by other computing devices in the computer network 100 and/or facilitating trick modes by the requesting computing device 105.

In some embodiments, as explained above, the computing device 105 (or in some embodiments, a conventional computing device) may send a conventional request (without an explicit indication of the quality level, and instead, using bitrate and bandwidth constraints, among other possible parameters), and the segment selection logic 216 responds to the request by referencing the manifest 218 to ascertain the best quality level subject to the client-communicated bandwidth constraint, and selecting and then sending the corresponding segment of the determined quality level.

The memory 204 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 204 may incorporate electronic, magnetic, optical, semi-conductive, and/or other types of storage media. Note that the memory 204 may have a distributed architecture, where various components are situated remotely from one another, which can be accessed by the processing device 202. Thus, in general, the memory 204 may comprise one or more tangible (non-transitory) computer readable storage media (e.g., a memory device) encoded with software comprising computer executable instructions and when the software is executed (by the processing device 202) it is operable to perform the operations described herein.

The software in memory 204 may include one or more separate programs, each of which comprises an ordered listing of executable instructions for implementing logical functions. In the embodiment shown in FIG. 2, the software in memory 210 includes the operating system 214 and the segment selection logic 216, as explained above. Functionality of the segment selection logic 216 may be implemented using a single module, or distributed among a plurality of modules.

When the segment selection logic 216 is in operation, the processing device 202 is configured to execute the segment selection logic 216 stored within the memory 204, to communicate data to and from the memory 204, and to generally control operations of the segment selection logic 216. The segment selection logic 216 and the O/S 214, in whole or in part, but typically the latter, are read by the processing device 202, and then executed.

Figure 3:
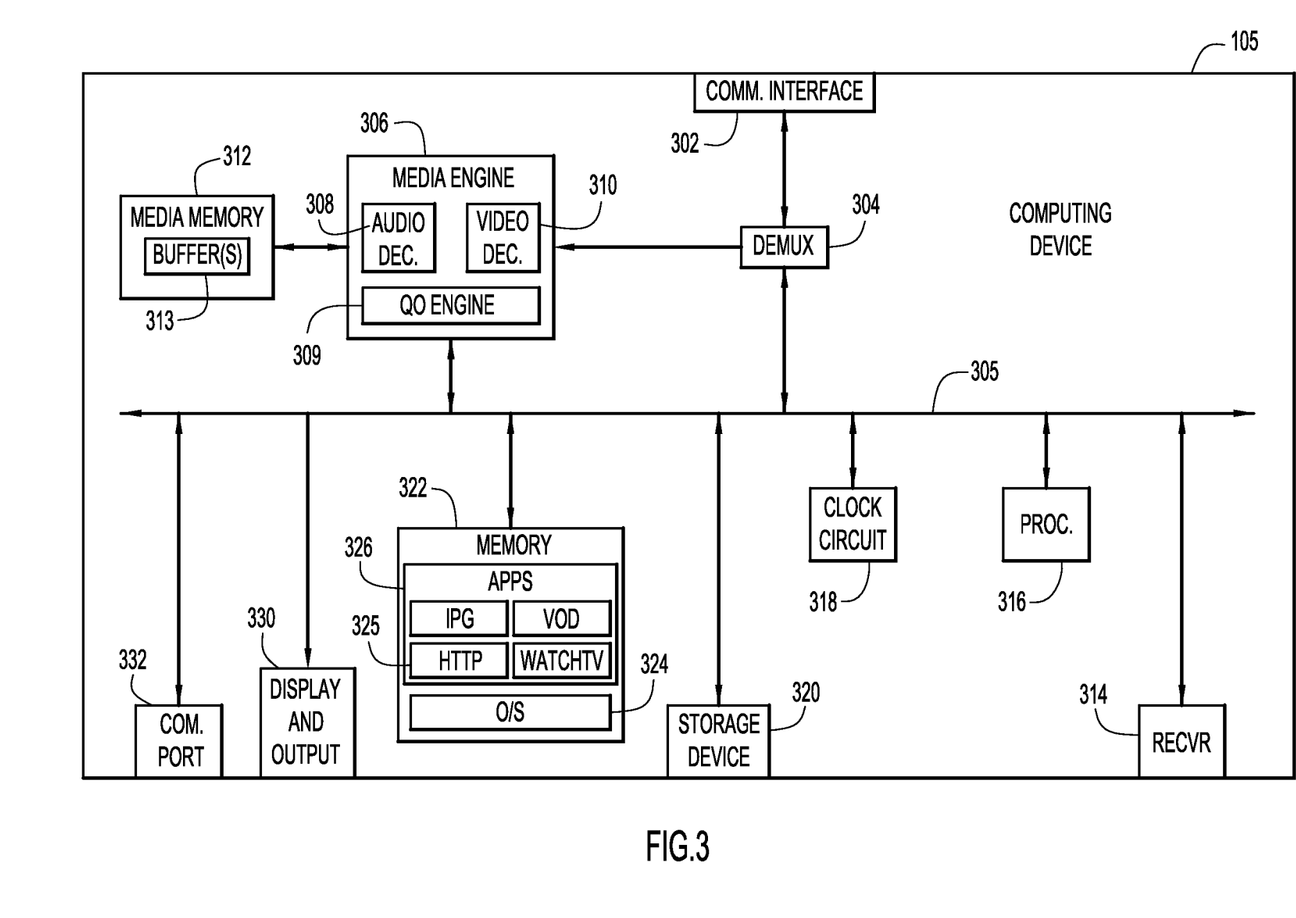
FIG. 3 is a schematic block diagram of an example embodiment of a computing device that receives video stream segments for display and viewing at the device in the system of FIG. 1.

FIG. 3 is a block diagram that illustrates an embodiment of an example computing device 105. It should be understood by one having ordinary skill in the art, in the context of the present disclosure, that the computing device 105 shown in FIG. 3 is merely illustrative, and should not be construed as implying any limitations upon the scope of the disclosure. Similar functionality may be found in the computing devices 102, 104, and 106. The computing device 105 includes a communication interface 302 suitable for enabling communication (e.g., TCP/IP) with devices of the computer network 100, and for receiving a manifest (or information therein) as well as the requested segments. For instance, the communication interface 302 may be of a type suitable for communication over an IP network, a coaxial cable network, an HFC network, and/or wireless network, among others. The communication interface 302 is coupled to a demultiplexer (herein, also called demux) 304. The demux 304 is configured to parse the metadata (e.g., in the packet header) of the segments and the body or payload data (the content, such as the sequence of video and/or audio frames). The metadata may include timestamp information, packet identifiers, program numbers, quality level, and/or other information necessary to decode the received segment. The segment and metadata information is forwarded to or otherwise received by the media engine 306 as explained further below.

Although the computing device 105 is described in the context of various Internet video streaming implementations, such as IPTV and VoD, it should be appreciated by one having ordinary skill in the art that the computing device 105 may comprise additional and/or different components in some embodiments. For instance, some embodiments of the computing device 105 may include a tuner system (e.g., radio frequency tuning, not shown) coupled to the communication interface 302, the tuner system comprising one or more tuners for receiving transport streams received via the communication interface 302. Further, in some embodiments, a demodulator may be employed, such as to demodulate the received carrier signal, wherein the demux 304 is configured to parse the transport stream packets of one or more defined carrier frequencies.

The demux 304 is coupled to a bus 305 and to a media engine 306 (also known as an audio/video (A/V) processing or decoding device). The media engine 306 comprises, in one embodiment, decoding logic comprising one or more of a respective audio decoder 308 and video decoder 310, which decode (e.g., decompress and reconstruct) the segments received via the communications interface 302. When the segments are played back, the original content stream is reconstructed in a seamless fashion. The computing device 105 dynamically requests and receives the segment with the proper quality level. The computing device 102 can adapt its content consumption rate according to the available receive bandwidth.

The media engine 306 further comprises buffer management functionality to facilitate (e.g., in cooperation with HTTP logic 325) a determination as to the need for downshifting or upshifting to a different quality level based upon techniques as described herein. The media engine 306 is further coupled to the bus 305 and to media memory 312, which in one embodiment comprises one or more buffers 313 for temporarily storing compressed and/or reconstructed pictures and/or audio frames. In some embodiments, the buffers of the media memory 312 and/or other buffers (e.g., network buffers) may reside in other memory (e.g., memory 322, explained below), or distributed among media memory 312 and memory 322. In addition, the media engine 306 includes a Quality Optimization (QO) Engine 309 that is used to determine an optimized quality of each segment based upon an analysis of a finite number or selected horizon of future segments in accordance to techniques described herein.

The computing device 105 comprises additional components coupled to bus 305. For instance, the computing device 105 further comprises a receiver 314 configured to receive user input (e.g., via direct-physical or wireless connection via a keyboard, remote control, voice activation, etc.) to convey a user's request or command (e.g., for program selection, stream manipulation such as fast forward, rewind, pause, channel change, etc.), one or more processors (one shown) 316 for controlling operations of the computing device 105, and a clock circuit 318 comprising phase and/or frequency locked-loop circuitry (or software, or combination of hardware and software) to lock into system clock information received in an audio, video, or A/V stream to facilitate decoding operations and to clock the output of reconstructed audiovisual content.

The computing device 105 further comprises, in one embodiment, a storage device 320 (and associated control logic) to temporarily store content (e.g., buffered content along with the buffer(s) 313 of the media memory 312) and/or to more permanently store recorded content. Memory 322 in the computing device 105 comprises volatile and/or non-volatile memory, and is configured to store executable instructions or code associated with an operating system (O/S) 324, and one or more applications 326 (e.g., interactive programming guide (IPG), video-on-demand (VoD), WatchTV (associated with broadcast network TV), HTTP logic 325, among other applications such as pay-per-view, music, personal video recording (PVR), driver software, etc.). The HTTP logic 325 comprises one or more processors with HTTP client functionality, and may generate requests for segments based, e.g., on information from the manifest 218 (e.g., including VQ/BR information 125). Decisions by the HTTP logic 325 to switch up or down (or maintain) the current quality level may be based on feedback from the media engine 306 (e.g., buffer levels, as explained above) and monitored bandwidth values. In particular, the HTTP logic 325 generates requests for segments based upon information received from the QO Engine 309, which utilizes techniques as described herein for determining quality levels of segments based upon an analysis of a selected horizon of future segments. The HTTP logic 325 stores the received manifest (or information included therein), and hence is aware of the available quality levels for segments stored at the content server device 114. Switching among different representations (e.g., to different quality levels) is thus enabled through the use of the information in the manifest (e.g., based upon VQ/BR information 125). Although depicted as software, functionality of the HTTP logic 325 may in some embodiments be configured in hardware, or a combination of hardware and software.

The computing device 105 is further configured with the display and output logic 330, as indicated above, which includes graphics and video processing pipelines, among other circuitry, as known in the art to process the decoded pictures and associated audio and provide for presentation (e.g., display) on, or associated with, a display device or other media device. A communications port 332 (or ports) is further included in the computing device 105 for receiving information from and transmitting information to other devices. For instance, the communication port 332 may feature USB (Universal Serial Bus), Ethernet, IEEE-1394, serial, and/or parallel ports, etc. In addition, communications port 332 may be configured for home networks (e.g., HPNA/MoCA, etc.). The computing device 105 may also include an analog video input port for receiving analog video signals.

One having ordinary skill in the art should understand in the context of the present disclosure that the computing device 105 may include other components not shown, including a compression engine, memory, decryptors, samplers, digitizers (e.g., analog-to-digital converters), multiplexers, conditional access processor and/or application software, driver software, Internet browser, among others. Further, though the HTTP logic 325 is illustrated as residing in memory 322, it should be understood that in some embodiments, the HTTP logic 325 may be incorporated in the media engine 306, or elsewhere, such as in the O/S 324, among other locations or in conjunction with other logic of the computing device 105. Similarly, in some embodiments, functionality for one or more of the components illustrated in, or described in association with, FIG. 3 may be combined with another component into a single integrated component or device.

Certain embodiments of an adaptive streaming system may encompass all or part of one or a combination of the following: the encoding device 116, the cache server 108, the content server 114, or one or more computing devices 102, 104, 105, and/or 106.

The HTTP logic 325, the media engine 306, the encoding logic 122, and/or the segment selection logic 216 of certain embodiments of the present disclosure can be implemented in hardware, software, firmware, or a combination thereof. In embodiments where the HTTP logic 325, the media engine 306, the encoding logic 122, and/or the segment selection logic 216 are implemented in software or firmware (collectively, software code or software logic or simply logic), such embodiments are stored in memory and executed by a suitable instruction execution system utilizing one or more processors of the computing device. When the HTTP logic 325, the media engine 306, the encoding logic 122, and/or the segment selection logic 216 are implemented in software, it should be noted that the HTTP logic 325, the media engine 306, the encoding logic 122, and/or the segment selection logic 216 may be stored on any computer readable storage medium for use by or in connection with any computer related system or method. Thus, in general, the HTTP logic 325, the media engine 306, the encoding logic 122, and/or the segment selection logic 216 may comprise one or more tangible (non-transitory) computer readable storage media (e.g., a memory device) encoded with software comprising computer executable instructions and when the software is executed being operable to perform the operations described herein. In the context of this document, a computer readable storage medium is an electronic, magnetic, optical, semiconductive, or other tangible, physical device or means that can contain or store a computer program for use by or in connection with a computer related system or method. The HTTP logic 325, the media engine 306, the encoding logic 122, and/or the segment selection logic 216 may be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions.

In embodiments where all or a portion of the functionality of the HTTP logic 325, the media engine 306, the encoding logic 122, and/or the segment selection logic 216 are implemented in hardware, such functionality of the HTTP logic 325, the media engine 306, the encoding logic 122, and/or the segment selection logic 216 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
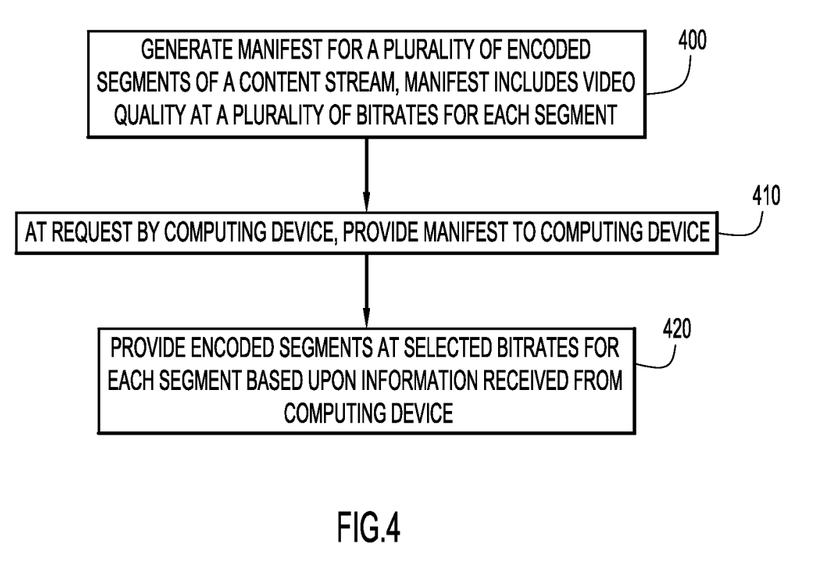
FIG. 4 is a flow chart that depicts an example process for encoding segments of a content stream at different bitrates and corresponding quality levels utilizing the system of FIG. 1.

An example method for optimizing quality for segments of a content stream utilizing the system as described herein and depicted in FIGS. 1-3 is now described with reference to the flowcharts of FIGS. 4 and 5. Referring to FIG. 4, at 400, the encoding device 116 generates a manifest 124 (which may further be revised or supplemented as the manifest 218 stored within memory 204 of the content server 114) for a content stream, where the manifest includes a plurality of bitrates and corresponding quality scores for encoded video segments to be downloaded by one or more computing devices 102, 104, 105, 106, 108. As previously noted, the content stream can be obtained, e.g., from storage device 212 that stores content (e.g., movies or other video presentations) at different quality levels (e.g., Movie A at CQA#1, CQA#2 ... CQA#N, Movie B at CQB#1, etc.). At 410, in response to a computing device, e.g., computing device 105, requesting certain content, the content server 114 provides the manifest associated with the requested content to the computing device to facilitate determination by the computing device of encoding bitrates at which to receive segments of the content stream based upon a quality optimization utilizing the techniques described herein. At 420, segments of the content stream are provided to the computing device at the bitrates selected by the computing device for each segment based upon the quality optimization.

Figure 5:
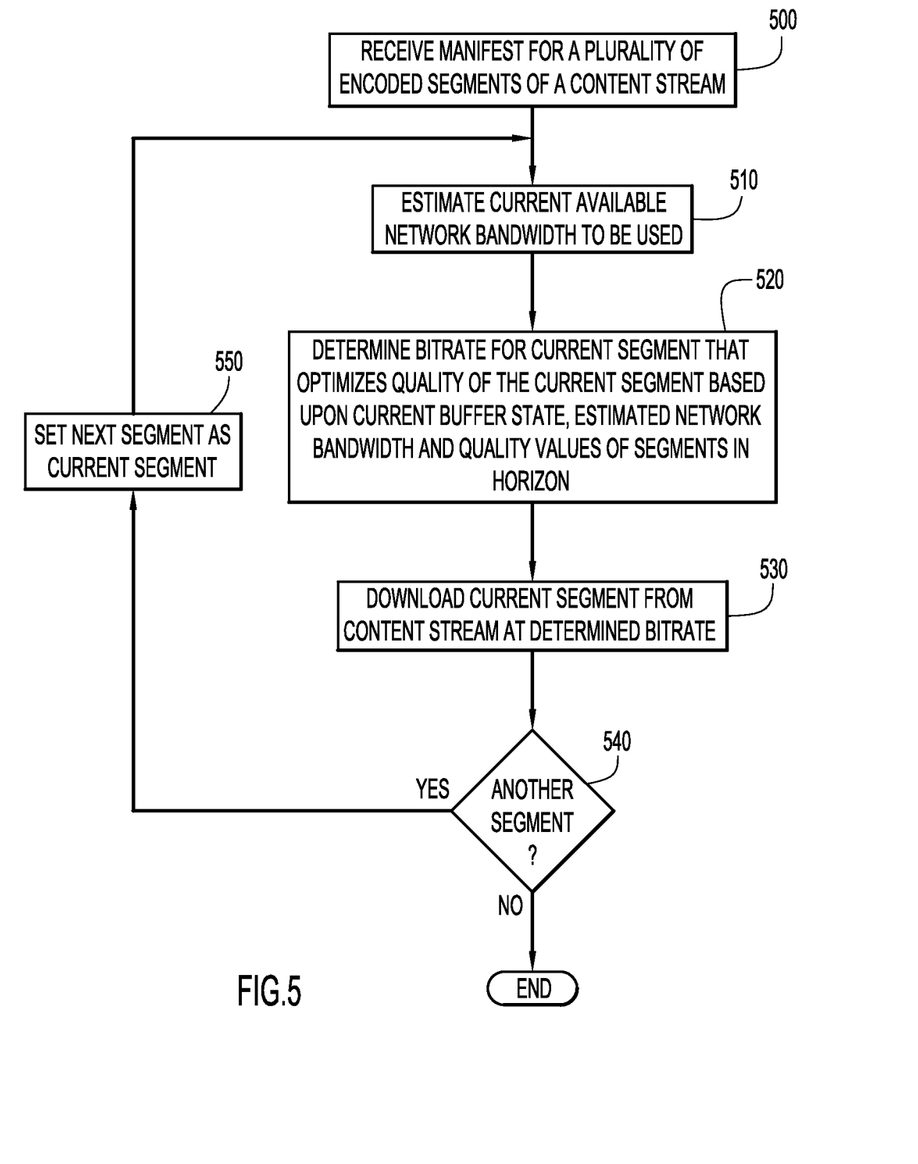
FIG. 5 is a flow chart that depicts an example process of optimizing quality for segments of a content stream based upon buffer and horizon constraints utilizing the system of FIG. 1.

Referring to FIG. 5, when a user at a computing device desires to view content available from the content server 114, the manifest for the content stream is provided to the computing device at 500. The techniques are described herein in relation to computing device 105 (e.g., depicted in FIG. 3). However, as previously noted, any other suitable computing device can also be utilized having similar hardware and/or software components, including a QO Engine, for performing the techniques described herein. The manifest includes information relating to the video quality score for each available segment bitrate (VQ/BR information 125) of each encoded segment of the content stream. At 510, an estimate is made of the current available network bandwidth to be used by the computing device 105. The estimated network bandwidth can be determined by the computing device in any suitable manner (e.g., based upon any conventional or other suitable measurement or estimation method). At 520, the QO Engine 309 of the computing device 105 determines an encoding bitrate for a current segment that optimizes quality of the current segment based upon the current buffer state, the estimated network bandwidth and quality values of segments of the content stream in a selected horizon (based upon the online algorithm and one or more dynamic programming algorithms that function as described herein). At 530, the current segment at the determined encoding bitrate that optimizes quality is downloaded from the content server 114. In the event there is another segment for the stream (determined at 540), the next segment is set as the current segment at 550 and the process is repeated at 510.

It is noted that, while the flowchart depicted in FIG. 5 provides a step in which the manifest is initially received at a computing device, the process can be easily modified such that the manifest can be received any number of times by the computing device during the process. For example, in certain scenarios the manifest can be periodically updated such that a modified manifest is provided to the computing device (e.g., with modified VQ/BR information).

The QO Engine 309 of the media engine 306, in making the determination at 520 of an encoding bitrate for a current segment, utilizes an online algorithm and one or more dynamic programming algorithms for bitrate selection of the video segments, where a suitable bitrate is selected for each segment based upon a quality optimization analysis over a selected future time window or horizon and taking into account current buffer constraints of the computing device 105. At each rate selection step, the QO Engine 309 utilizes the most recent information available, solves an optimization problem for video segments within a selected horizon, and computes an optimal bitrate among available bitrates for the most immediate video segment (with the procedure being repeated for each next segment). Information that is available for use by the engine at each step includes the current estimated link bandwidth for the computing device 105 (determined at 510, e.g., based upon any conventional or other suitable measurement or estimation method) and the bitrates and quality scores of video segments within the defined horizon (provided within the manifest 124).

The QO Engine 309 employs a series of rate selection steps n (where n=1, 2, 3, ...) in determining a bitrate for each segment in the content stream that yields an optimized quality given the current conditions (e.g., network bandwidth conditions, buffer conditions, and quality levels of segments within a finite number or horizon from the current segment). A bitrate, defined as R(n), for downloading a current video segment is determined at each step n. There are a finite number of available bitrates for each video segment. Thus, the number of available bitrates for a current video segment is defined as R(n, l), where l=1, 2, 3, ..., L, in which L is the number of available bitrates. Each bitrate R(n, l) is further associated with a video quality score Q(n, l). The quality score associated with a selected bitrate R(n) for a current segment is defined as Q(n). As previously noted, the quality score for a video segment can be determined utilizing any suitable technique, with some non-limiting examples including PSNR and -MSE.

The algorithms utilized by the QO Engine 309 are based upon maximizing some aggregate measurement of video quality for the content stream over the horizon. The techniques described herein utilize two objective functions for maximizing quality. The first objective maximizes an average quality score, defined by:

$$\max \frac{1}{N} \sum_n Q(n) \qquad \text{(Equation 1)}$$

where N is the number of segments (e.g., number of segments within the horizon).

A second objective maximizes a worst-case quality score over the number of segments N as follows:

$$\max \min_n Q(n) \qquad \text{(Equation 2)}$$

An extension to Equation 1 and Equation 2 is to precisely consider the quality variation by incorporating a multiplier a(n−1,n) at each step n, so that Q(n) in Equation 1 and Equation 2 is replaced by:

$$Q'(n) = a(n-1,n) Q(n), \qquad \text{(Equation 2b)}$$

where Q(n) corresponds to the original Q(n). This multiplier a(n−1,n) discounts the overall score when the quality has shifted from one level to another. For example, set a(n−1,n)=1 if the video bitrates at step n−1 and n are selected from the same quality level, and set a(n−1,n)=0.8 if they are from different levels. This way, the objective functions consider both the average quality and the quality variation.

A second extension to above the objectives (Equation 1, Equation 2 and Equation 2b) is to take any quality score and raise it to some power b according to a power function, that is, replace Q(n) in these equations by:

$$Q''(n) = Q(n)^b \qquad \text{(Equation 2c)}$$

where Q(n) corresponds to the original Q(n), and b≥1.

It is noted that any one or more of the previously described algorithms can be applied to any of the objectives described herein.

Optimization of video quality is also based upon the constraints of the media storage buffer 313 as well as the horizon size H(n) for the current segment being analyzed during a rate step. The buffer comprises a queue of video segments. The buffer size evolves over time as a new video segment enqueues into the buffer at each step, and an old video segment dequeues at a specific video playout rate. As described herein, B(0) denotes an initial buffer size and B(n) is the client buffer size at the end of a step n. Before video playout starts (i.e., before any depletion of the buffer), the buffer size is defined as:

$$B(n)=B(n-1)+1 \quad \text{(Equation 3)}$$

After video playout starts, the buffer size is defined as:

$$B(n)=B(n-1)+1-R(n)/W(n) \quad \text{(Equation 4)}$$

where W(n) is the link bandwidth at step n, and R(n)/W(n) is the segment download duration. Thus, replenishment or enqueuing of the buffer is one segment per step, while depletion or dequeuing of the buffer is R(n)/W(n) at the end of step n.

A lower bound buffer value, $B_L$, and an upper bound buffer value, $B_H$, are defined by the Engine 309. With the exception of an initial state where $B(n)<B_L$, the algorithm utilized by the Engine 309 maintains the buffer size when processing a current segment such that $B_L \leq B(n) \leq B_H$. The Engine 309 further attempts to converge to a value of $B(n)=B_{ref}$, where $B_L \leq B_{ref} \leq B_H$.

The time horizon size is defined by the QO Engine 309 as H(n), where H(n) can vary with H(n)≥1. For example, the time horizon size may be constant for a certain number of segments in a content stream, but as the segments approach the end of the stream the value of H(n) is reduced so as to not extend the horizon beyond the content stream. In accordance with the techniques described herein, only the video bitrate and quality information for segments from the current segment to H(n)−1 steps ahead of the current segment are analyzed to determine a bitrate corresponding to an optimized quality for the current segment. In other words, only the information R(m, l), Q(m, l), for m=n, n+1, . . . , n+H(n)−1, and l=1, 2, . . . , L is made available to the algorithm utilized by the engine 309 to determine R(n) for the current segment.

To apply the algorithm to determine R(n) for the current segment, the QO engine 309 utilizes an OptimizeQualityOnline algorithm to further determine the bitrate over multiple steps. The OptimizeQualityOnline algorithm applies a further algorithm at each step as described herein and referred to as OptimizeQualityWithinHorizon. The following inputs are provided for the OptimizeQualityOnline algorithm:

Global inputs:
$B_L$=lower buffer bound
$B_H$=upper buffer bound
$B_{ref}$=reference buffer level
$\kappa_B$=buffer speed of convergence toward $B_{ref}$
Inputs available at step n:
W(n)=link bandwidth (e.g., estimated bandwidth at n)
B(n−1)=buffer size at end of previous step
H(n)=horizon size, H(n)≥1
R(m, l), Q(m, l), for m=n, n+1, . . . , n+H(n)−1, and l=1, 2, . . . , L (bitrate and quality information (available from manifest) for segments from current segment to segment at H(n)−1 steps ahead of current segment, or the segment at the endpoint of the finite horizon)

Utilizing the input information, the algorithm determines a bitrate R(n) for the current video segment n.

At each rate selection step n, given the previously noted inputs, the engine 309, utilizing one or more algorithms referred to herein as OptimizeQualityWithinHorizon, repeatedly solves an optimization problem to optimally allocate bitrates among segments within the horizon. The OptimizeQualityWithinHorizon algorithm(s) uses the following inputs:

Inputs:
$B_{init}$=initial buffer size
$B_{final}$=final buffer size
$B_L$=lower buffer bound
$B_H$=upper buffer bound
W=current estimated bandwidth
H=current horizon size
R(m, l), Q(m, l), for m=1, 2, . . . , H, and l=1, 2, . . . , L (bitrate and quality information for segments from step 1 to step H)

Utilizing OptimizeQualityWithinHorizon, the bitrate outputs for segments from the current segment to a segment that is H−1 steps ahead of the current segment are determined (i.e., values of R(m) for m=1, . . . , H). The OptimizeQualityWithinHorizon algorithm(s) can produce acceptable results in scenarios in which certain conditions, such as link bandwidth and video source characteristics, do not change.

However, in reality, bandwidth and video source characteristics will likely change for the content stream. Therefore, in accordance with techniques described herein, the engine 309 only applies the bitrate for the current segment in which the algorithm is applied, and the same algorithm is repeated at each further step so that segment bitrates are determined one step at a time. Utilizing this approach, an OptimizeQualityOnline algorithm can be applied as follows:

$B_{init}$=B(n−1)
$B_{final}$=B(n−1)+$\kappa_B$*H(n)*($B_{ref}$−B(n−1))
$B_L^{local}$=min($B_L$, B(n−1))
$R^{local}$(m) (for m=1, . . . , H)=OptimizeQualityWithinHorizon ($B_{init}$, $B_{final}$, $B_L^{final}$, $B_H$, W(n), H(n), R(m, l), Q(m, l), where m=n, n+1, . . . , H(n)−1, and l=1, 2, . . . , L)

The bitrate selected for the current segment, R(n), is then output as $R^{local}(1)$, that is, the rate selected for the first segment within the group of H segments. For the next segment (segment n+1), the same OptimizeQualityOnline algorithm is again applied to obtain the bitrate for this segment, and so on for further segments.

It is noted that the buffer value $B_L^{local}$ is upper-bounded by $B_{init}$ and thus may differ from $B_L$, and the OptimizeQualityWithinHorizon function requires $B_L \leq B_{init} \leq B_H$. The per-step buffer convergence speed toward $B_{ref}$ is controlled by the parameter $\kappa_B$.

Having defined the inputs for the OptimizeQualityWithinHorizon function, optimization of quality to find suitable bitrates for segments at each step n is determined by the engine 309 using a dynamic programming algorithm so as to solve the problem by breaking it down into smaller sub-problems which can be solved iteratively. As previously noted, each bitrate R(n) for a segment at step n has a corresponding quality score defined as:

$$Q(n)=Q(R(n)) \quad \text{(Equation 5)}$$

Equation 5 can be rewritten based upon the buffer as follows:

$$Q((n-1,B(n-1))\to(n,B(n)))=Q(R(n))$$

In other words, the resulting quality, by moving the buffer from B(n−1) at step n−1 to B(n) at step n, is Q(R(n)). The value of Q(R(n)) can then be evaluated, using Equations 3-5.

A similar quality score Q((m, B(m))→(n, B(n))) can be defined for n−m>1. However, for this case, there may be multiple possible paths from (m, B(m)) to (n, B(n)) that result in different quality values. An optimal quality score can be obtained over all the quality values as Q*((m, B(m))→(n, B(n))), where optimization can be defined in any suitable manner, such as in an average sense (e.g., maximizing an average quality score, as in Equation 1) or in a worst-case sense (e.g., maximizing a worst-case quality score, as in Equation 2).

In a polynomial-time dynamic programming algorithm, a problem can be broken down into smaller sub-problems to achieve a more efficient solution. Utilizing a polynomial-time dynamic programming equation with optimality in the average sense, the following is true:

$$Q^*((m, B(m)) \to (n, B(n))) = \max_{B(s): B_L \leq B(s) \leq B_H} Q^*((m, B(m)) \to (s, B(s))) + Q^*((s, B(s)) \to (n, B(n))),$$

for all m<s<n.

For this equation, going from (m, B(m)) to (n, B(n)) requires the processing of step s. The maximum quality must be the sum of the quality of the sub-problems with all possible $B_L \leq B(s) \leq B_H$. To solve for quality optimization, smaller sub-problems can be solved, followed by solving even smaller sub-problems, and so on. Eventually, the equation reduces to Q((n−1, B(n−1)→(n, B(n))).

Similarly, with optimality in the worst-case sense, the following is true:

$$Q^*((m, B(m)) \to (n, B(n))) = \max_{B(s): B_L \leq B(s) \leq B_H} \min(Q^*((m, B(m)) \to (s, B(s))), Q^*((s, B(s)) \to (n, B(n)))),$$

for all m<s<n.

The bitrate solution can be implemented in a forward or backward recursive manner. The following two example algorithms, OptimizeQualityWithinHorizonAverageQuality and OptimizeQualityWithinHorizonWorstCaseQuality, are now described for determining bitrates for segments at each step n utilizing a dynamic programming algorithm.
OptimizeQualityWithinHorizonAverageQuality At each step n, set $B(0)=B_{init}$, and calculate and store, for all R(1, l), where l=1, . . . , L:

$$Q^*((0,B(0)) \to (1,B(1))) = Q((0,B(0)) \to (1,B(1)))$$

For m=2, 3, . . . , H, calculate and store:

$$Q^*((0, B(0)) \to (m, B(m))) = \max_{B(m-1): B_L \leq B(m-1) \leq B_H} Q^*((0, B(0)) \to (m-1, B(m-1))) + Q^*((m-1, B(m-1)) \to (m, B(m))),$$

for all $B_L \leq B(m) \leq B_H$, where the value of B(m) is quantized to discrete bins.

Optimal bitrates R*(m) (m=1, . . . , H) are determined based upon the calculated values of Q*((0, B(0))→(m, B(m))). For example, the manifest 124 can be consulted to determine which bitrates correspond with the calculated quality score values. The bitrate for the current segment is R*(1).
OptimizeQualityWithinHorizonWorstCaseQuality At each step n, set $B(0)=B_{init}$, and calculate and store, for all R(1, l), where l=1, . . . , L:

$$Q^*((0,B(0)) \to (1,B(1))) = Q((0,B(0))(1,B(1)))$$

For m=2, 3, . . . , H, calculate and store:

$$Q^*((0, B(0)) \to (m, B(m))) = \max_{B(m-1): B_L \leq B(m-1) \leq B_H} \min(Q^*((0, B(0)) \to (m-1, B(m-1))), Q^*((m-1, B(m-1)) \to (m, B(m)))),$$

For all $B_L \leq B(m) \leq B_H$, where the value of B(m) is quantized to discrete bins.

Optimal bitrates R*(m) (m=1, . . . , H) are determined based upon the calculated values of Q*((0, B(0))→(m, B(m))). The bitrate for the current segment is R*(1).

As described in FIG. 5, in response to determining the bitrate for the current segment at 520, the current segment at the determined bitrate is downloaded at 530 and the process is then repeated (i.e., a repeat of steps 510-530, including utilizing OptimizeQualityOnline and OptimizeQualityWithinHorizon algorithms to determine the bitrate for the next video segment) for each further segment until no further video segments are required.

Figure 6:
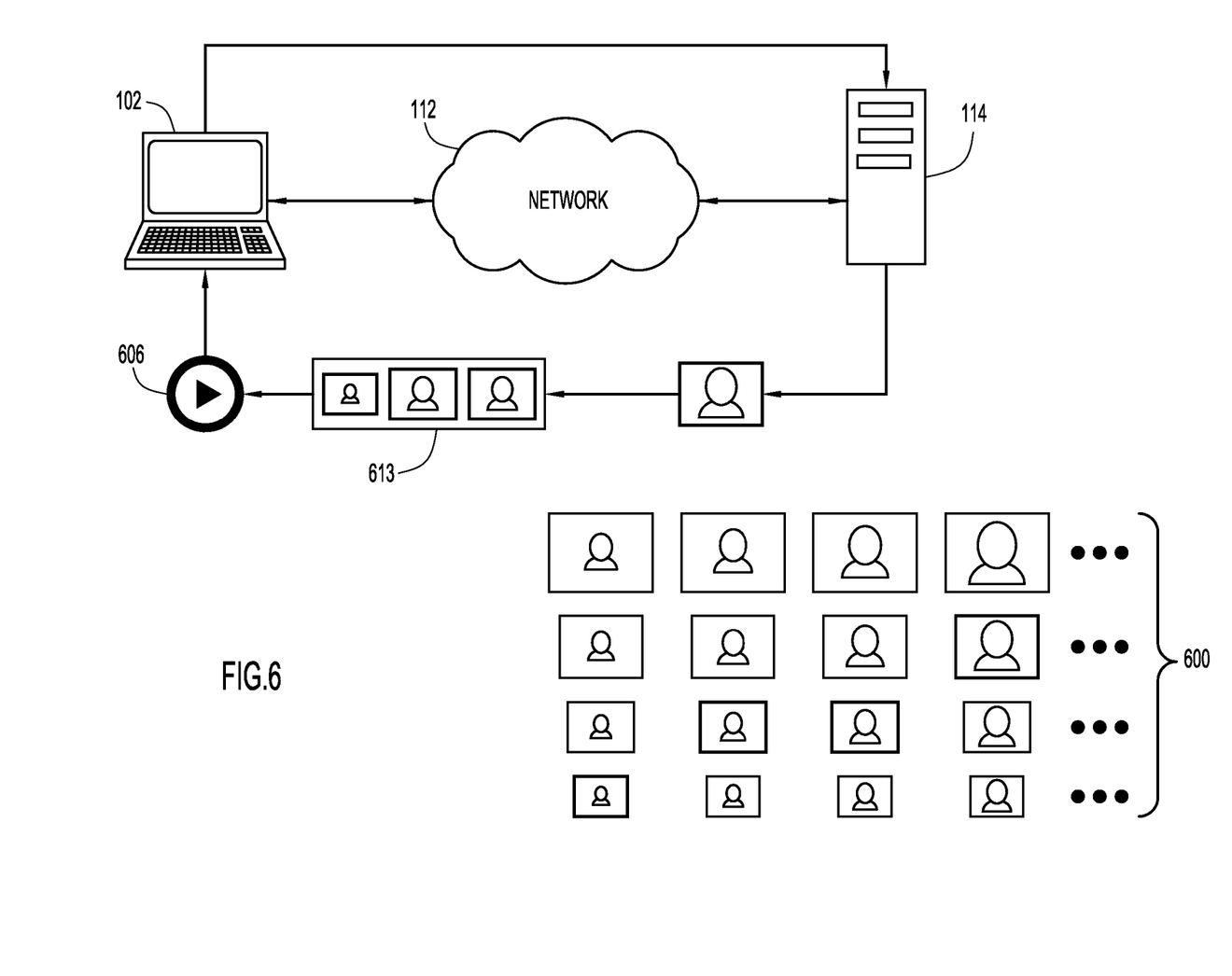
FIG. 6 is a schematic diagram depicting a computing device receiving video segments from a content server at selected bitrates in accordance with techniques described herein.

The example embodiment of FIG. 6 schematically depicts the selection by a computing device (e.g., any of the computing devices as depicted in FIG. 1, such as a laptop 102) of each video segment at a selected encoding bitrate from a collection 600 of video segments of a content stream, where the collection 600 includes the segments encoded at different bitrates and corresponding quality levels (e.g., fetched by content server 114 from storage device 212, such as Movie A). The encoding bitrate of each video segment is selected based upon the techniques described herein so as to optimize quality of the displayed video content when played by the media player 606 (e.g., a media player of the laptop 102, which is configured in a similar manner and with similar functionality as media engine 306 of the computing device 105, including a QO Engine for the media player 606). Each segment is downloaded at the selected encoding bitrate and temporarily stored in a storage buffer 613 before it is played in the temporal sequence utilizing the media player 606.

Conventional algorithms select the next segment's bitrate based only on video bitrate information, and not directly on video quality of the segment. However, given a fixed bitrate, the quality of the video will vary depending on the video content (e.g., a high-motion or high-complexity scene, such as an action scene with complex graphics, vs. a low-motion or low-complexity scene, such as a still scene). The techniques presented herein improve upon such conventional algorithms to further take into account video quality of the segment.

While the techniques are described herein in relation to optimization of video quality during downloading of video content from a server, it is noted that the techniques for optimizing quality are applicable to any types of media content (e.g., audio, video and/or other types of content) to be downloaded for use at a computing device.

Thus, the techniques described herein provide an online algorithm and one or more dynamic programming algorithms for optimizing video (and/or other content) quality in adaptive streaming by taking into account buffer and horizon constraints when solving quality optimization problems. The techniques are applicable for both CBR and VBR encoded video content and can further be utilized with any linear video quality score values assigned to video segments (i.e., the techniques work with various types of video quality measurements).

Implementation of the techniques into a system such as described herein improves the visual quality by providing a higher average quality or reduction in quality variation during playout of the content stream at a computing device. The techniques can implement algorithms that maximize average video quality as well as maximize worst-case quality. Further, any online streaming video systems can utilize the techniques as described herein, including systems that provide video-on-demand as well as live streaming services.

The above description is intended by way of example only.

What is claimed is:

1. A method comprising:
obtaining information relating to encoding bitrates and content quality scores for content segments of a content stream, wherein the content segments of the content stream are provided by a content server and downloaded by a computing device;
for each content segment, determining an encoding bitrate for the content segment to be downloaded from the content server, wherein determining the encoding bitrate for a current content segment is based upon an estimated current network bandwidth, constraints of a buffer into which downloaded content segments are stored, and also upon quality scores associated with content segments within a selected horizon extending from the current content segment to a future content segment in the content stream at an endpoint of the horizon, and the determining the encoding bitrate for the current content segment further comprises:
applying a dynamic programming algorithm that utilizes buffer constraint information and quality scores associated with content segments within the selected horizon to determine an optimized quality score value for the current content segment; and
applying an online algorithm that iteratively calculates the encoding bitrates of segments within the selected horizon and determines the encoding bitrate associated with the optimized quality score value for the current content segment; and
downloading each content segment with the determined bitrate for the content segment from the content server.

2. The method of claim 1, wherein the applying the dynamic programming algorithm comprises maximizing an average score for the quality scores associated with content segments within the selected horizon.

3. The method of claim 1, wherein the applying the dynamic programming algorithm comprises maximizing a worst-case quality score for the quality scores associated with content segments within the selected horizon.

4. The method of claim 1, wherein the applying the dynamic programming algorithm further comprises adjusting the optimized quality score value for the current content segment to a modified quality score value based upon a difference between the optimized quality score value of the current content segment and an optimized quality score value of a previous content segment.

5. The method of claim 1, wherein the applying the dynamic programming algorithm further comprises adjusting the optimized quality score value for the current content segment by a power function, where the optimized quality score value for the current content segment is modified by a power b, with $b \geq 1$.

6. The method of claim 1, wherein the buffer constraint information associated with a current content segment comprises a lower buffer bound value, an upper buffer bound value, a buffer size associated with a content segment that is previous to the current content segment, and a network bandwidth value associated with the computing device.

7. The method of claim 1, wherein the information relating to content quality scores further comprises a plurality of encoding bitrates, a plurality of segment durations, and a plurality of content quality scores corresponding with the encoding bitrates for each content segment.

8. The method of claim 1, wherein the information relating to encoding bitrates and content quality scores for content segments of the content stream is obtained from a manifest provided by the content server.

9. An apparatus comprising:
one or more memories comprising a quality optimization engine that includes one or more applications to optimize quality of content segments for a content stream downloaded from a content server and a buffer to store downloaded content segments of the content stream;
a communication interface device configured to enable communications over the network; and
a processor configured to execute and control operations of the quality optimization engine so as to:
obtain information relating to bitrates and content quality scores for content segments of the content stream, wherein the content segments of the content stream are provided by a content server for use by a computing device;
for each content segment, determine an encoding bitrate for the content segment to be downloaded from the content server, wherein determining the encoding bitrate for a current content segment is based upon an estimated current network bandwidth, constraints of a buffer into which downloaded content segments are stored, and also upon quality scores associated with content segments within a selected horizon extending from the current content segment to a future content segment in the content stream at an endpoint of the horizon, and the processor is further configured to determine the encoding bitrate for the current content segment by:
applying a dynamic programming algorithm that utilizes buffer constraint information and quality scores associated with content segments within the selected horizon to determine an optimized quality score value for the current content segment; and
applying an online algorithm that iteratively calculates the encoding bitrates of segments within the selected horizon and determines the encoding bitrate associated with the optimized quality score value for the current content segment; and
download each content segment with the determined bitrate for the content segment from the content server.

10. The apparatus of claim 9, wherein the processor is configured to apply the dynamic programming algorithm by maximizing an average score for the quality scores associated with content segments within the selected horizon.

11. The apparatus of claim 9, wherein the processor is configured to apply the dynamic programming algorithm by maximizing a worst-case quality score for the quality scores associated with content segments within the selected horizon.

12. The apparatus of claim 9, wherein the buffer constraint information associated with a current content segment comprises a lower buffer bound value, an upper buffer bound value, a buffer size associated with a content segment that is previous the current content segment, and a network bandwidth value associated with the computing device.

13. The apparatus of claim 9, wherein the information relating to content quality scores further comprises a plurality of encoding bitrates and a plurality of content quality scores corresponding with the encoding bitrates for each content segment.

14. The apparatus of claim 9, wherein the processor is configured to obtain information relating to encoding bitrates and content quality scores for content segments of the content stream from a manifest provided by the content server.

15. One or more computer readable memory storage devices encoded with software comprising computer executable instructions and when the software is executed operable to:
   obtain information relating to encoding bitrates and content quality scores for content segments of a content stream, wherein the content segments of the content stream are provided by a content server and downloaded by a computing device;
   for each content segment, determine an encoding bitrate for the content segment to be downloaded from the content server, wherein determining the encoding bitrate for a current content segment is based upon an estimated current network bandwidth, constraints of a buffer into which downloaded content segments are stored, and also upon quality scores associated with content segments within a selected horizon extending from the current content segment to a future content segment in the content stream at an endpoint of the horizon, wherein the instructions are operable to determine the encoding bitrate for the current content segment by:
      applying a dynamic programming algorithm that utilizes buffer constraint information and quality scores associated with content segments within the selected horizon to determine an optimized quality score value for the current content segment; and
      applying an online algorithm that iteratively calculates the encoding bitrates of segments within the selected horizon and determines the encoding bitrate associated with the optimized quality score value for the current content segment; and
   download each content segment with the determined bitrate for the content segment from the content server.

16. The one or more computer readable memory storage devices of claim 15, wherein the instructions are operable to apply the dynamic programming algorithm comprises maximizing an average score for the quality scores associated with content segments within the selected horizon.

17. The one or more computer readable memory storage devices of claim 15, wherein the instructions are operable to apply the dynamic programming algorithm comprises maximizing a worst-case quality score for the quality scores associated with content segments within the selected horizon.

18. The one or more computer readable memory storage devices of claim 15, wherein the buffer constraint information associated with a current content segment comprises a lower buffer bound value, an upper buffer bound value, a buffer size associated with a content segment that is previous the current content segment, and a network bandwidth value associated with the computing device.

19. The one or more computer readable memory storage devices of claim 15, wherein the information relating to content quality scores further comprises a plurality of encoding bitrates and a plurality of content quality scores corresponding with the encoding bitrates for each content segment.

20. The one or more computer readable memory storage devices of claim 15, wherein the instructions are operable to obtain encoding bitrates and content quality scores for content segments of the content stream from a manifest provided by the content server.

* * * * *